(12) United States Patent
Chipman et al.

(10) Patent No.: US 7,237,574 B2
(45) Date of Patent: Jul. 3, 2007

(54) CONTROLLED DISPERSION MULTI-PHASE NOZZLE AND METHOD OF MAKING THE SAME

(75) Inventors: Stephen R. Chipman, Provo, UT (US); Michael R. Luque, Orem, UT (US); Herman Pieterse, Tucson, AZ (US); Jeffrey C. Robison, Provo, UT (US); Craig C. Smith, Provo, UT (US)

(73) Assignee: Caldera Engineering LLC, Provo, UT (US)

( * ) Notice: Subject to any disclaimer, the term of this patent is extended or adjusted under 35 U.S.C. 154(b) by 6 days.

(21) Appl. No.: 11/127,918

(22) Filed: May 12, 2005

(65) Prior Publication Data

US 2006/0065869 A1 Mar. 30, 2006

Related U.S. Application Data

(60) Provisional application No. 60/570,925, filed on May 13, 2004.

(51) Int. Cl.
*F16K 51/00* (2006.01)
(52) U.S. Cl. .......................... 138/44; 251/122
(58) Field of Classification Search ........ 251/120–124; 138/44
See application file for complete search history.

(56) References Cited

U.S. PATENT DOCUMENTS

| | | | | |
|---|---|---|---|---|
| 3,220,693 A | * | 11/1965 | Dickson | 251/122 |
| 4,116,488 A | | 9/1978 | Hsueh et al. | 299/4 |
| 4,133,484 A | | 1/1979 | Jannone | 239/214.25 |
| 4,413,646 A | * | 11/1983 | Platt et al. | 251/122 |
| 4,503,878 A | * | 3/1985 | Taylor | 251/122 |
| 4,565,210 A | * | 1/1986 | Heine et al. | 251/122 |
| 4,578,022 A | | 3/1986 | Kenney | 425/7 |
| 4,636,339 A | | 1/1987 | Kenney | 264/12 |
| 4,662,401 A | * | 5/1987 | Zingg et al. | 138/44 |
| 4,735,229 A | * | 4/1988 | Lancaster | 251/122 |
| 5,071,477 A | * | 12/1991 | Thomas et al. | 75/744 |
| 5,101,745 A | | 4/1992 | Podevels et al. | 111/127 |
| 5,105,889 A | | 4/1992 | Misikov et al. | 166/372 |
| 5,207,176 A | | 5/1993 | Morhard et al. | 110/246 |
| 5,388,985 A | | 2/1995 | Musil et al. | 431/116 |
| 5,553,778 A | * | 9/1996 | Jameel et al. | 239/1 |
| 5,579,705 A | | 12/1996 | Suzuki et al. | 110/185 |
| 5,611,947 A | | 3/1997 | Vavruska | 219/121.52 |
| 5,650,107 A | | 7/1997 | Vetter et al. | 264/102 |
| 5,958,222 A | | 9/1999 | Radcliffe et al. | 208/163 |
| 5,983,906 A | | 11/1999 | Zhao et al. | 134/1.1 |
| 5,994,678 A | | 11/1999 | Zhao et al. | 219/530 |
| 6,110,255 A | | 8/2000 | Williams et al. | 75/744 |
| 6,143,253 A | | 11/2000 | Radcliffe et al. | 422/145 |
| 6,210,485 B1 | | 4/2001 | Zhao et al. | 118/724 |
| 6,221,435 B1 | | 4/2001 | Nielsen | 427/421 |
| 6,482,250 B1 | | 11/2002 | Williams et al. | 75/744 |

(Continued)

Primary Examiner—John Bastianelli
(74) Attorney, Agent, or Firm—Snell & Wilmer L.L.P.

(57) ABSTRACT

A nozzle design and method for designing such a nozzle being adapted for three phase slurry flow from the choke into the flash tank during pressure let-down in autoclave mining operations that uses a selection of the expansion ratio in the choke to select a nozzle dispersion angle to select a spread of the flow over the slurry pool in the flash tank, to generally maximize the use of the pool for energy dissipation without causing undo wear and tear on the tank walls.

14 Claims, 7 Drawing Sheets

U.S. PATENT DOCUMENTS 6,523,573 B2 2/2003 Robison et al. ............... 137/44
6,764,030 B2 * 7/2004 Habib et al. ................ 239/461
6,793,198 B2 * 9/2004 Robison et al. ............. 251/357
6,978,841 B2 * 12/2005 Hoffman et al. ............ 166/381

* cited by examiner $$d\theta = \frac{du}{u}\sqrt{M^2 - 1} \qquad (.1)$$

$$M^2 = \frac{u^2}{v^2}\left\{\frac{v_{fg}}{h_{fg}}\left[\left(\frac{\partial h}{\partial p}\right)_x - v\right] - \left(\frac{\partial v}{\partial p}\right)_x\right\} \qquad (.2)$$

$$h = h_o - \frac{u^2}{2} \qquad (.3)$$

$$s = s_o \qquad (.4)$$

$$h(p,x) = (1-s)\left[xh_g(p) + (1-x)h_f(p)\right] + sc_{ps}T(p) \qquad (.5)$$

$$s(p,x) = (1-s)\left[xs_g(p) + (1-x)s_f(p)\right] + sc_{ps}\ln\frac{T(p)}{T_o} \qquad (.6)$$

$$x = \frac{h - sc_{ps}T(p) - (1-s)h_f}{(1-s)h_{fg}} \qquad (.7)$$

$$(1-s)\left[s_f(p) + \left(\frac{h_o - \frac{u^2}{2} - sc_{ps}T(p) - (1-s)h_f(p)}{(1-s)h_{fg}(p)}\right)s_{fg}(p)\right] + sc_{ps}\ln\frac{T(p)}{T_o} - s_o = 0 \qquad (.8)$$

$$\left(\frac{\partial v}{\partial p}\right)_x = (1-s)\left[x\frac{dv_g}{dp} + (1-x)\frac{dv_f}{dp}\right] \qquad (.9)$$

$$\left(\frac{\partial h}{\partial p}\right)_x = (1-s)\left[x\frac{dh_g}{dp} + (1-x)\frac{dh_f}{dp}\right] + sc_{ps}\frac{dT}{dp} \qquad (.10)$$

FIGURE 10

$$\theta_2 - \theta_1 = \int_{u_1}^{u_2}\left[\frac{\sqrt{M^2-1}}{u}\right]du \qquad (.11)$$

$$\theta_{Ae} = \theta_A - \theta_e = \int_{u_A}^{u_e}\left[\frac{\sqrt{M^2-1}}{u}\right]du = \int_{u_t}^{u_e}\left[\frac{\sqrt{M^2-1}}{u}\right]du - \int_{u_t}^{u_A}\left[\frac{\sqrt{M^2-1}}{u}\right]du \qquad (.12)$$

$$h + \frac{u^2}{2} = h_o \qquad (A.1)$$

$$\frac{uA}{v} = w \qquad (A.2)$$

$$s_e \geq s \geq s_o \qquad (A.3)$$

$$h = f_s c_{ps} T + (1-f_s)h_w \qquad (A.4)$$

$$v = f_s v_s + (1-f_s)v_w \qquad (A.5)$$

$$s = f_s \ln\frac{T}{T_o} + (1-f_s)s_w \qquad (A.6)$$

$$h_w = h_f + x h_{fg} \qquad (A.7)$$

$$v_w = v_f + x v_{fg} \qquad (A.8)$$

$$s_w = s_f + x s_{fg} \qquad (A.9)$$

$$u = \sqrt{2(h_o - h)} \qquad (A.10)$$

$$\frac{w}{A} = G = \frac{u}{v} = \frac{\sqrt{2(h_o-h)}}{v} \qquad (A.11)$$

$$G(h_o, s_u, p_u) = G(h_o, s_d, p_d) \qquad (A.12)$$

$$\Gamma(h_o, s_u, p_u) = \Gamma(h_o, s_d, p_d) \qquad (A.13)$$

FIGURE 11

CONTROLLED DISPERSION MULTI-PHASE NOZZLE AND METHOD OF MAKING THE SAME

CROSS REFERENCE TO RELATED APPLICATIONS

This application claims the benefit of prior, co-pending, commonly owned U.S. Provisional Patent Application Ser. No. 60/570,925, entitled Controlled Dispersion Multi-Phase Nozzle and Method of making the Same, filed on May 13, 2004 and naming as inventors Stephen R. Chipman, Michael R. Luque, Herman Pieterse, Jeffrey C. Robison and Craig C. Smith.

BACKGROUND OF INVENTION

1. Field of the Invention

This invention relates to a nozzle for the control of the pattern of a flashing multi-phase flow at the outlet of a pressure let-down valve. More specifically, this invention relates to a nozzle with a choke that provides an optimal flow pattern at exit, by controlling the nozzle dispersion angle to match the elements in the receiving tank.

2. Description of Related Art

A variety of nozzles for use in pressure let-down valves have been proposed. Generally, these prior nozzles do not control the nozzle dispersion angle.

Although the following references may not necessarily qualify as "prior art", the reader is referred to the following U.S. patent documents for general background material. Each of these patent documents is hereby incorporated by reference in its entirety for the material contained therein.

U.S. Pat. No. 4,116,488 describes an in-situ mining method and apparatus for recovering copper and/or nickel from deep-seated deposits.

U.S. Pat. No. 4,133,484 describes a liquid spraying device capable of producing minuscule particles of liquid in a uniform pattern.

U.S. Pat. No. 4,578,022 describes an apparatus for generating an aerosol powder from a melt that includes an atomization die having an orifice.

U.S. Pat. No. 4,636,339 describes a method for generating an aerosol powder from a melt.

U.S. Pat. No. 5,101,745 describes an apparatus and method that is disclosed for cultivating soil and turf by utilization of pressurized liquid injected into the soil and turf.

U.S. Pat. No. 5,105,889 describes a method of production of the formation fluid that is used in wells with a low formation pressure and consists in that in the well from a flow of the formation fluid.

U.S. Pat. No. 5,207,176 describes a hazardous waste incinerator.

U.S. Pat. No. 5,388,985 describes a burner assembly that has a combination chamber in which combustion takes place in an elongate centrally disposed combustion tube.

U.S. Pat. No. 5,579,705 describes a plasma furnace and method of operating where the flow of waste gas is directed downwardly by means of a refractory guide chute.

U.S. Pat. No. 5,611,947 describes a steam plasma reactor that incorporates an induction steam plasma torch.

U.S. Pat. No. 5,650,107 describes a method for dewatering a molten synthetic resin using a two-phase liquid mixture of a thermoplastic synthetic resin melt and an aqueous phase.

U.S. Pat. No. 5,958,222 describes an arrangement for the controlled production of an essentially linearly array of hydrocarbon feed injection jets that reduces required clearances and elevation.

U.S. Pat. Nos. 5,983,906 and 5,994,678 describe systems, methods and apparatus for depositing titanium films.

U.S. Pat. No. 6,110,255 describes a wear-resistant flash tank pressure let down nozzle for use in passing an ore slurry into an ore slurry flash tank.

U.S. Pat. No. 6,143,253 describes an arrangement for the controlled production of an essentially linear array of hydrocarbon feed injection jets.

U.S. Pat. No. 6,210,485 B1 describes an apparatus and process for the vaporization of liquid precursors and deposition of film on suitable substrate.

U.S. Pat. No. 6,221,435 B1 describes a process for use of subcritical compressed fluids to reduce viscosity and to enhance atomization.

U.S. Pat. No. 6,482,250 B1 describes a wear-resistant flash tank pressure let down nozzle for use in passing an ore slurry into an ore slurry flash tank.

U.S. Pat. No. 6,523,573 B2 describes a new flash tube device adapted specifically for use with hot erosive flow streams.

SUMMARY OF INVENTION

It is desirable to provide a nozzle having a choke device that can provide an optimal flow pattern at the nozzle exit. It is particularly desirable to provide a choke design that controls the nozzle dispersion angle.

Accordingly, it is an object of an embodiment of this invention to provide a nozzle having a choke that provides a desirable flow patter at the nozzle exit.

It is another object of an embodiment of this invention to provide a nozzle having a choke that will control nozzle dispersion angle as desired.

It is a further object of an embodiment of this invention to provide a nozzle that will control the pattern of a flashing multi-phase flow at the outlet of a pressure let-down valve.

It is a still further object of an embodiment of this invention to provide a nozzle that controls the dissipation of energy during pressure letdown.

Another object of an embodiment of this invention is to provide a nozzle that is capable of dissipating letdown energy while minimizing the wear and tear on the nozzle.

Additional objects, advantages and other novel features of this invention will be set forth in part in the description that follows and in part will be apparent to those skilled in the art upon examination of the following or may be learned with the practice of the invention. The objects and advantages of this invention may be realized and attained by means of the instrumentalities and combinations particularly pointed out in the appended claims. Still other objects of the present invention will become readily apparent to those skilled in the art from the following description wherein there is shown and described present preferred embodiments of the invention, simply by way of illustration of the best modes currently known to carry out this invention. As it will be realized, this invention is capable of other different embodiments, and its several steps, details, and specific components, dimensions and materials, are capable of modification in various aspects without departing from the invention. Accordingly, the drawings and descriptions should be regarded as illustrative in nature and not as restrictive.

BRIEF DESCRIPTION OF DRAWINGS

The accompanying drawings incorporated in and forming a part of the specification, illustrate embodiments of the present invention. Some, although not all, alternative embodiments are described in the following description.

In the drawings:

FIG. 10 is a first page of equations of derivation of the model used to design the nozzle of this invention.

FIG. 11 is a second page of equations of the derivation of the model used to design the nozzle of this invention.

Reference will now be made in detail to the present preferred embodiments of the invention, examples of which are illustrated in the accompanying drawings.

DETAILED DESCRIPTION

This invention is a controlled dispersion multiple phase nozzle for use in controlling phase change during pressure letdown. Phase change during pressure letdown has the potential to release significant amounts of energy. For example, in autoclave mining operations each state of pressure letdown in a three-stage system may require the dissipation of one to two megawatts of power. Because slurry is acidic and abrasive, the materials required to control these systems can be very expensive. Turbines and other techniques to productively use the energy release have not thus far been demonstrated to be feasible. This invention addresses the significant challenge of dissipation of this energy without excessive wear and tear on relatively expensive equipment.

The control of the dissipation of energy during pressure letdown accomplished in this invention has been developed with use of a model of the letdown process. This model has been used to predict the pressure, velocity and/or the state of the slurry as it flows through the valve and choke system between the vessels. The high and low pressures involved in each stage of pressure letdown have been assumed for the model to be maintained in the upstream and downstream vessels during operation. Additional details of the model are provided in this description in association with the discussion of FIG. 7. Dissipation of much of the energy released during pressure let-down by forming a shock in a flashtube extension of the choke has been successfully accomplished. However, it can be appropriate to allow the slurry to exit the choke as a supersonic flow and then to control the dispersion angle of the flow, using the slurry pool in the tank to dissipate the released energy. This invention is directed to the control of the dispersion angle to control the dissipation of energy.

Figure 1:
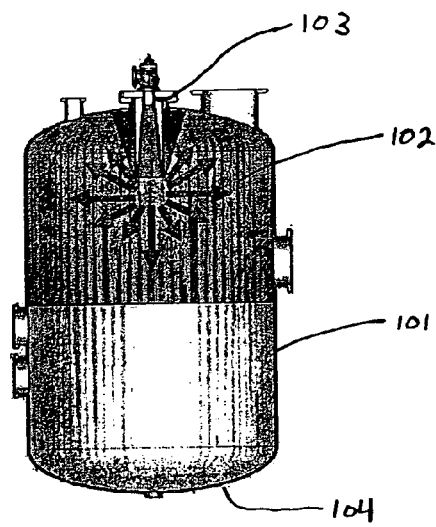
FIG. 1 is an illustration of the explosive flashing that can occur when nozzle exit pressure is too high.
Figure 2:
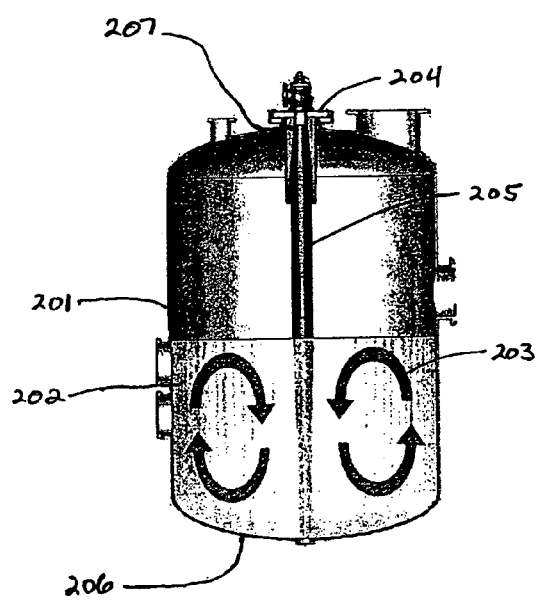
FIG. 2 is an illustration of the vessel wear that occurs with high nozzle exit velocity.

When slurry flows out of the end of a choke into the flash tank during pressure let-down, the slurry will quite suddenly expand if the pressure in the outlet stream is above the pressure in the flash tank. FIG. 1 shows this explosive flashing 102 that occurs when the nozzle 102 exit pressure is too high. If the pressure in the flow is below the pressure in the flash tank 101, but the flow is still supersonic, the flow stream will contract as oblique shocks form to allow the pressure in the supersonic flow to equalize with the pressure in the tank 101. And, if the pressure in the flow is equal to the pressure in the tank 101, the flow will exit from the end without significant change in its momentum, as a jet directed outward from the choke. An efficient jet directed toward the bottom 104 (assuming top entry) of the flash tank 101 is sometimes undesirable in that it has been known to wear holes in the impingement blocks on the bottom 104 of the tank 101. FIG. 2 shows the effect of high nozzle 204 exit velocity that can provide significant agitation of the pool 202 within the tank 201 but can contribute to wear in the bottom 206 of the tank 201. Alternatively, a flow that disperses at too great an angle from the choke 207 exit has been known to sometimes cause excessive wear on the tank's walls, blast tubes and other equipment.

Figure 3:
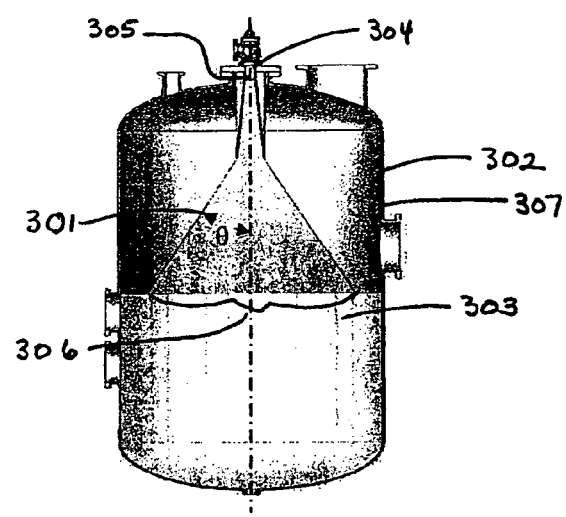
FIG. 3 is an illustration of the desired dispersion angle used to dissipate energy in the vessel.

An optimal dispersion angle 301 for some uses, as shown in FIG. 3, effectively uses the pool 303 in the tank 302 to dissipate energy. In "Control of Energy Dissipation in Pressure Letdown with Multi-Phase Flows" C. C. Smith, M. R. Luque, J. C. Robison, S. R. Chipman and H. Pieterse, Proceedings of Corrosion Applications 2003, Coeur d'Alene Id., Sep. 5-11, 2003, incorporated herein by reference in its entirety, the inventors have described models to predict the pressure, velocity and steam fraction (state) of the slurry at the outlet of the choke, as a function of the ratio of the area of the choke outlet to the area of the choke throat. In this invention, a dispersion nozzle and a method for manufacturing such a dispersion nozzle is presented which, designed using the dispersion angle model described below, meets the objective of spreading the slurry stream from the choke 304 outlet 305 over a significant area 306 of the surface slurry pool 303 while minimizing the wear and tear to the tank 302 walls 307 and other equipment. Moreover, by controlling these flows, the carry over of slurry solids and liquids with the steam into the reheaters can be minimized.

The model for evaluating the dispersion angle of the slurry as it leaves the choke exit applies theory originally developed by Prandtl and Meyer in 1908 for the flow of compressible gasses. This theory, with regard to compressible gasses, is now found in many fluid dynamics textbooks. Since the expansion must take place by a change in velocity and pressure perpendicular to a Mach line (a line in the flow perpendicular to which the velocity is at the velocity of sound), Prandtl and Meyer showed that changes in angle of the streamline are governed by the relation shown as Eq. 0.1 in FIG. 10, where θ is the angle of the flow streamline. For a three-phase slurry, the Mach number, M, can be defined by the relationship shown in as Eq. 0.2 in FIG. 10. Since the Mach number and the velocity are functions of the state of the slurry, given an initial state and velocity, the terms in Equation 0.2 must be determined as a function of the velocity in order to integrate Equation 0.1 numerically. Assuming the expansion process is both adiabatic and isentropic, the enthalpy and entropy of the slurry for a given velocity are given by the equations shown as Eq. 0.3 and Eq. 0.4 of FIG. 10. Thus, defining the enthalpy and entropy defines the state. To find the pressure and quality for a given state given the enthalpy and entropy requires the simultaneous solution of the equations Eq. 0.5 and Eq. 0.6 of FIG.

10. Eq. 0.7 is a rearrangement of Eq. 0.5. Then, substituting Eq. 0.3, 0.4 and 0.7 into Eq. 0.6 we determine Eq. 0.8 of FIG. 10. This yields a transcendental equation of pressure only (when the velocity is given) that can be solved for the pressure as a function of velocity using the steam tables to determine the quantities in the equation for a given pressure. The quality can then be found by substituting into Eq. 0.7. With the pressure and quality defined, the Mach number can be found by substituting into Eq. 0.2, noting the partial derivatives in Eq. 0.2 can be found from the relationships of Eq. 0.9 and Eq. 0.10 of FIG. 10. The turning or dispersion angle that will occur during an isentropic expansion from state 1 to state 2 can be found by integrating Eq. 0.1, resulting in Eq. 0.11 of FIG. 11.

Next it is desirable to apply this model to the design/manufacture of a choke with a given dispersion angle. Choke design involves contouring the choke and valve. (if required) to control the mass flux through the choke, and the state (pressure, velocity and dispersion angle) at the choke outlet. Using the methodology, described in further detail later in this disclosure, allows for the determination of the pressure and velocity of the slurry as a function of the ratio of the area at the choke outlet to the area of the choke inlet $A_e$. Thus, the choke exit area ratio $A_e$ is one of the design parameters important to the design of the choke. Using the methods, described below, area ratio and velocity are found as a function of pressure for the given slurry constituents and upstream state. Using the above described theoretical model, the objective is to find the dispersion angle that results at the outlet at each pressure where the area ratio and velocity have been calculated. Pressure, velocity and dispersion angle as a function of area ratio are plotted for design purposes. The appropriate choke area ratio is then determined in order to obtain the desired choke outlet conditions.

Figure 4:
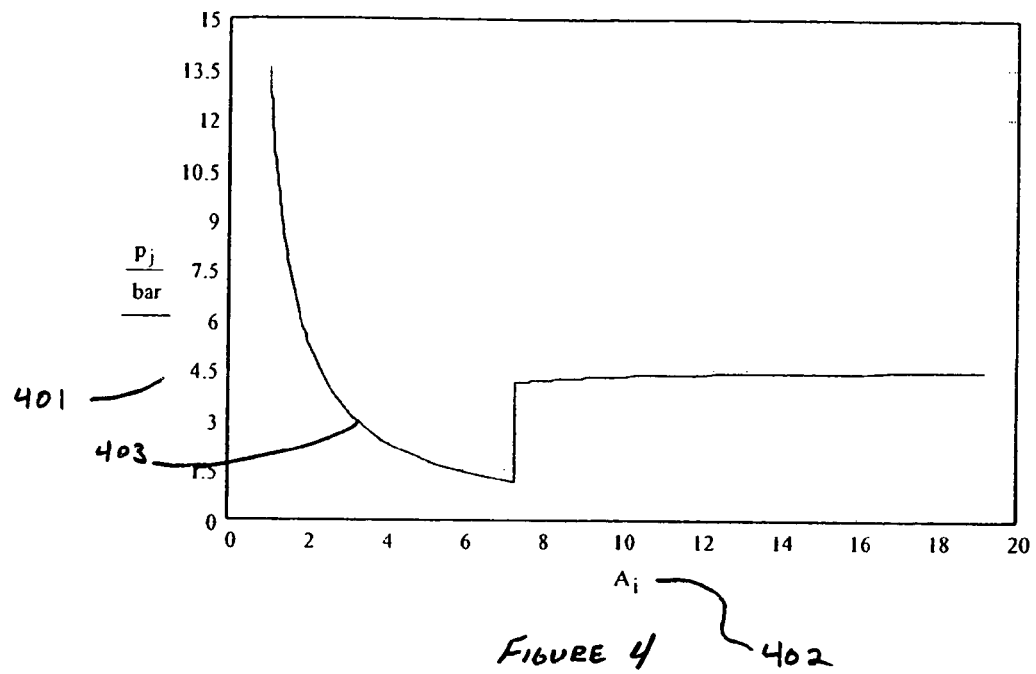
FIG. 4 is a plot of pressure as a function of area ratio.
Figure 5:
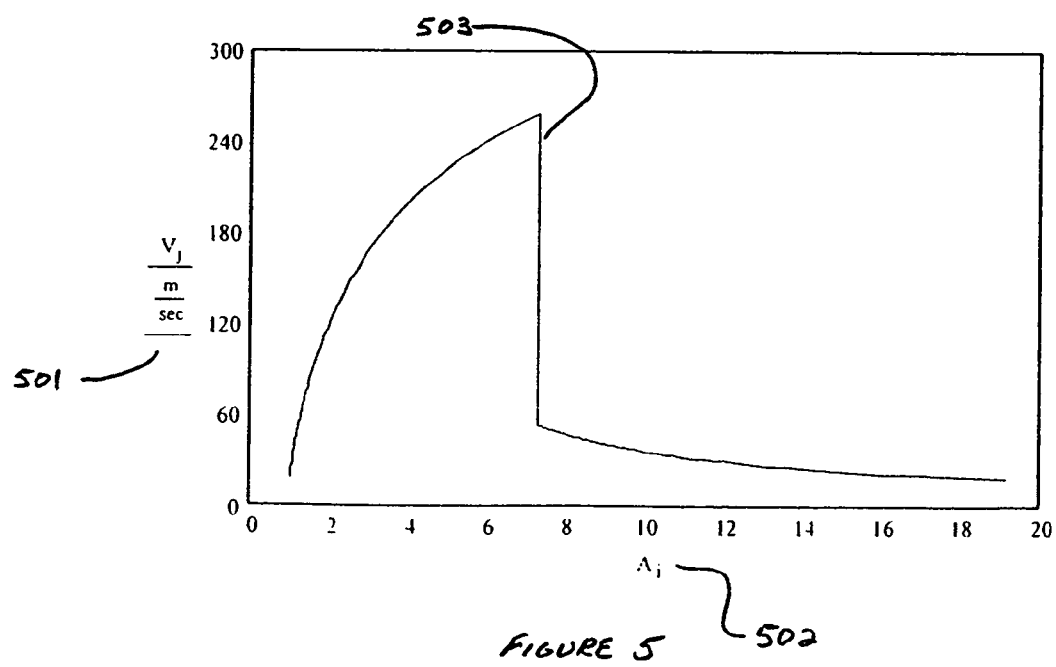
FIG. 5 is a plot of velocity as function of area ratio.
Figure 6:
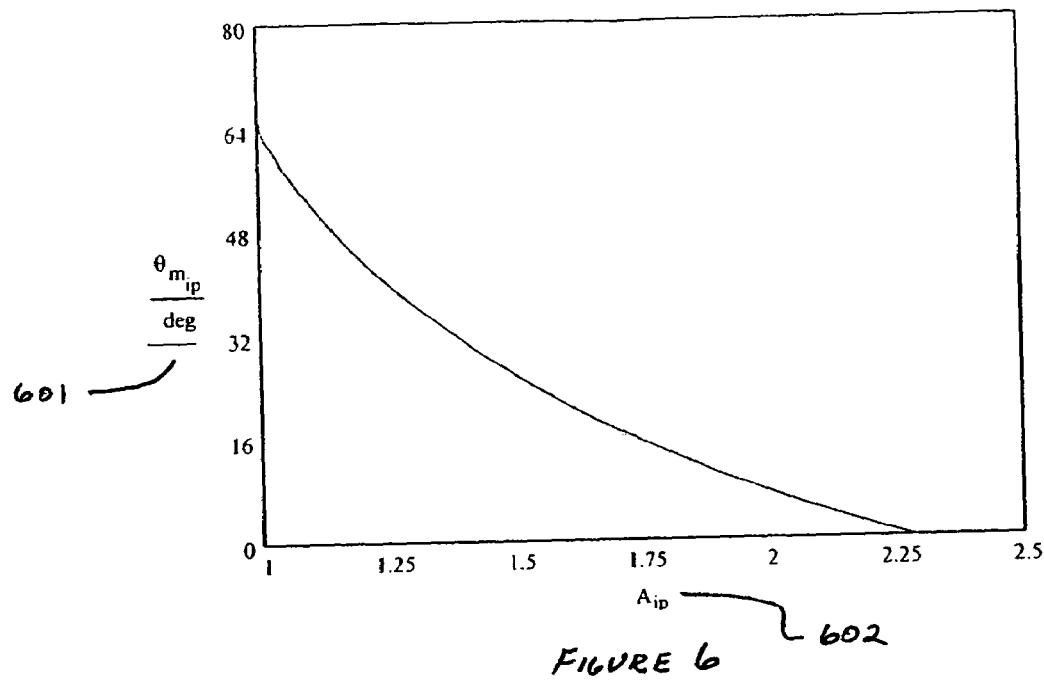
FIG. 6 is a plot of expansion angle upon exit as a function of area ratio.

To find the expansion angle as a function of area ratio, it is convenient to begin with Eq. 0.11, of FIG. 11, to find the expansion angle between the state at the area ratio, A, and the state at the pressure in the flash tank. Using the subscripts t, e, -and A, to denote the state at the throat of the choke, the exit tank pressure, and the expansion ratio, A, respectively, Eq. 0.11 can be rewritten as shown in Eq. 12 of FIG. 11, where $\theta_A$ is the angle of the streamlines at the choke exit area ratio, A, and $\theta_e$ is the angle of the streamlines after the stream has expanded to the pressure in the exit flash tank. Thus, since the velocity at each area ratio, A, Eq. 0.12 yields the expansion angle $\theta_{Ae}$, which will result if the slurry is allowed to expand from that area ratio into a flash tank with pressure, $p_e$. Using the methods described above, the pressure, velocity and dispersion angle, $\theta_{Ae}$, are plotted as a function of Area ratio, A, in FIGS. 4-6 for a slurry with 33.6% solids, an upstream pressure of 15 bar, and upstream temperature of 197 degrees C., and a downstream pressure of 4.5 bar. Specifically, FIG. 4 shows the pressure 401 as a function of Area ratio 402. FIG. 5 shows the velocity 501 as a function of Area ratio 502. FIG. 6 shows expansion angle 601 upon exit as a function of Area ratio 602.

In FIG. 4, is observed that as the flow expands in the choke, the pressure drops 403. At an area ratio of approximately 2.3, the pressure has dropped to the exit pressure of 4.5 bar. Further expansion will drop the pressure somewhat below 4.5 bar, until at an area ratio of about 7.2 a shock will be formed. When this shock forms, the flow goes from supersonic to subsonic, the pressure suddenly rises from a low of 1.1 bar back up to 4.1 bar, while the velocity, shown in FIG. 5, drops 503 from a high of 259 m/sec to 52 m/sec. Further increases in area ratio (expansion) causes the pressure to rise and the velocity to drop until the pressure in the flash tank is matched.

If the shock forms as described above, the flow enters the flash tank in equilibrium with the pressure in the tank. If the shock does not form, the slurry flow is supersonic in the choke and is unaffected by the conditions in the tank since pressure variations cannot propagate upstream. When it is not feasible to form the shock, the expansion of the slurry should be designed to effectively use the slurry pool. If the pressure in the flow stream as it exits the choke is below the pressure in the tank, the flow will not continue to expand as it enters the tank, but oblique shocks will form to eventually slow the flow of the slurry to subsonic velocities. The high velocities resulting at the choke exit at these low pressures, however, have been known to penetrate the slurry pool, wear holes in the bottom of the tank, and indeed even wear holes in protective impingement blocks designed to protect the bottom of the tank.

If the slurry is expanded so that the pressure as it leaves the choke nozzle is higher than the pressure in the tank, the slurry will further expand upon exit. If this expansion is too great, the slurry will cause excessive wear on the tank and equipment near the nozzle exit. Blast tubes have sometimes been used to contain this "explosive" flashing upon exiting the choke nozzle. However, these blast tubes have been quite costly and with the wrong choke design have become sacrificial to protect the tank walls but have experienced excessive wear themselves. Choosing the correct expansion area ratio, however, controls the dispersion angle of the slurry as it further expands as it leaves the nozzle. For the case above, an area ratio of about 1.5 corresponds to an expansion angle of 25 degrees. If this expansion follows an expansion (half) angle built within the choke of 8 degrees, the total dispersion angle (relative to the flow centerline) to exit the nozzle would be 33 degrees. This angle can be used to spread the slurry flow over the slurry pool so that the larger surface area of the pool is used effectively to dissipate the energy in the stream without undue wear on the tank walls. The maximum velocity that would be encountered during this expansion is about 135 m/sec, with is the velocity obtained by an isentropic expansion down to the pressure of 4.5 bar. If the natural dissipation that will occur due to friction and other irreversibilities is accounted for, the actual velocities and dispersion angle will be somewhat lower.

Figure 7:
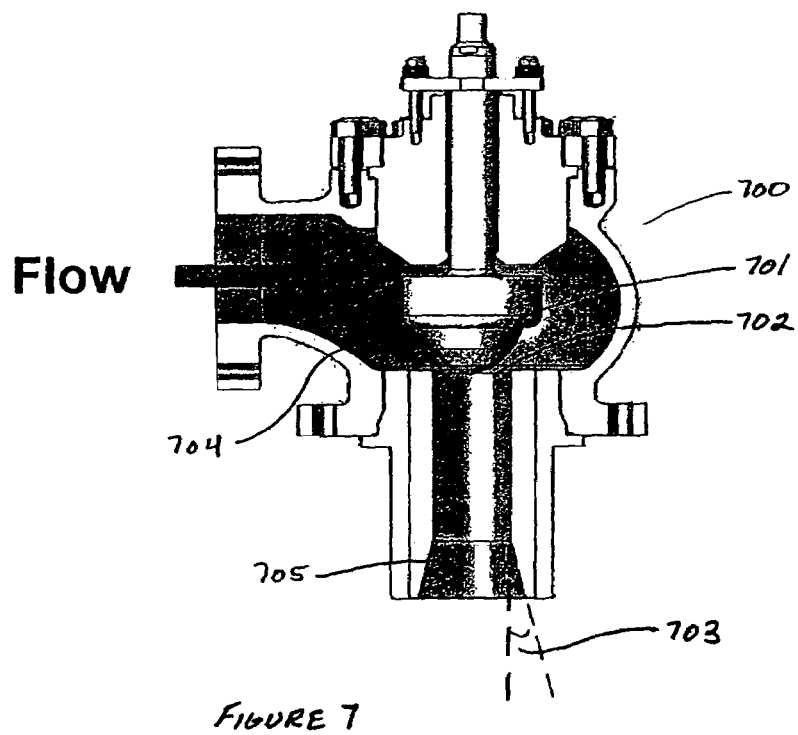
FIG. 7 is a cross-sectional view of a present embodiment of the nozzle of this invention integrated with a valve.

FIG. 7 shows a valve and choke configuration 700, which has an expansion (half) angle 703 selected by the method/process of this invention to spread the flow over the surface of the slurry pool in the flash tank, maximizing the use of the pool in the tank for energy dissipation without causing undo wear and tear on the tank. The plug head 701 in the valve 700 can be modulated to control the flow rate by changing the throat area 702. The throat 702 of the valve 700 is defined as the minimum flow area around the plug head 701. Some pressure drop occurs upstream 704 of the throat 702 of the valve 700. Because of the choked flow, the velocity at the throat 702 of the valve 700 is sonic. As the area expands downstream 705 of the throat 702, the pressure drops and the flow becomes supersonic.

Figure 8:
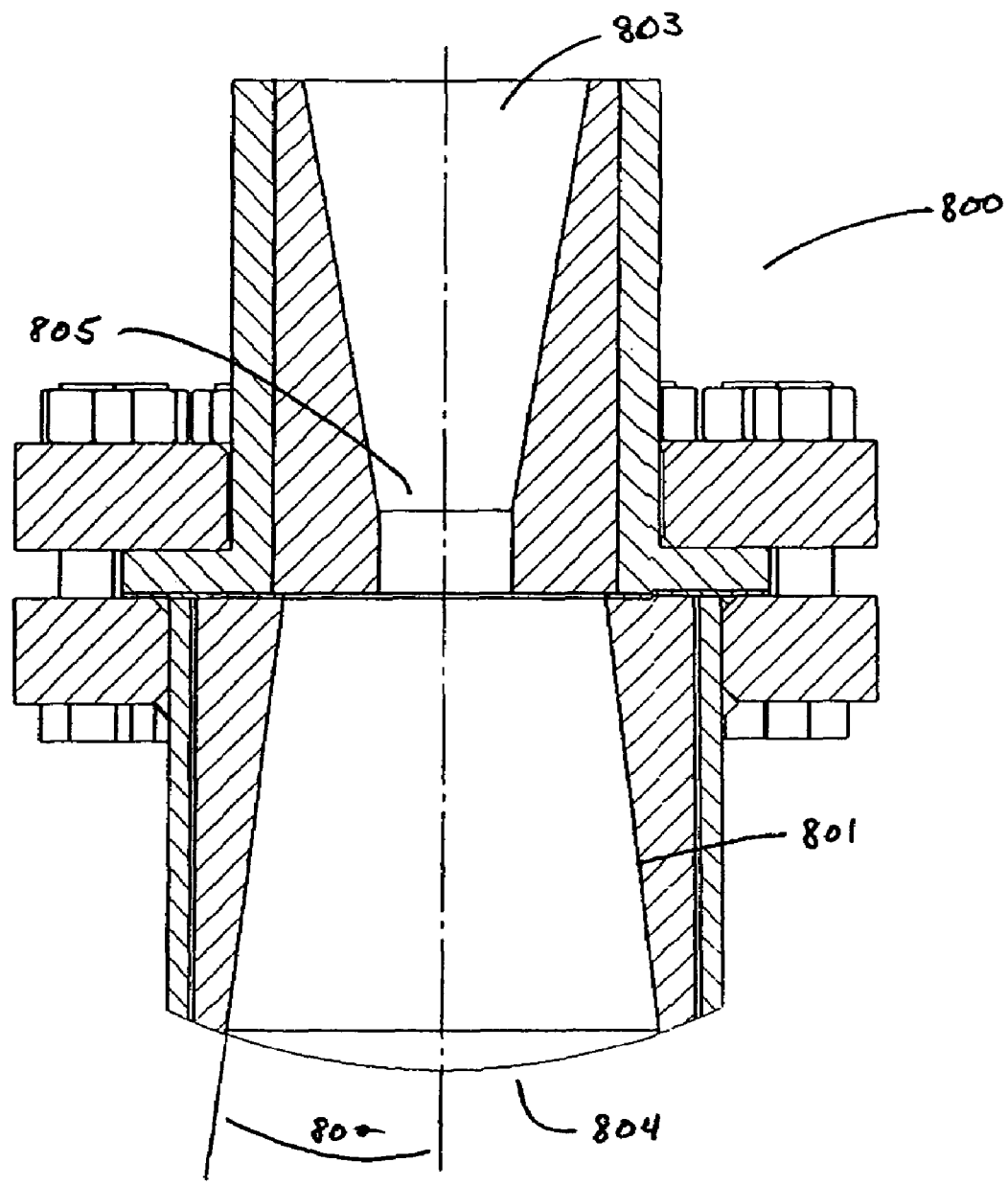
FIG. 8 is a cross-sectional view of an alternative embodiment of the nozzle of this invention as a stand-alone choke without a valve.

FIG. 8 shows an alternative embodiment of the nozzle 801 of this invention as a stand-alone choke 800 without a valve. This nozzle 801 is manufactured with a half angle 802 selected by the method/process of this invention to spread the flow over the surface of the slurry pool in the flash tank, and to thereby maximize the use of the pool in the tank for energy dissipation without causing undo wear and tear on the tank. The inlet 803 of the choke 800 can be used to control the flow rate by selecting the desired throat area 805.

In recent years, various models have been developed for choke sizing that give improved performance at nominal plant flow rates and that control at maximum and minimum operational rates. These models can be enhanced to provide greater accuracy by adding the following features or characteristics, as used in this invention, to choke sizing models: Energy released during flashing of water to steam is accounted for more accurately than in standard ANSI/ISA formulae.

This model predicts the relationship between the flow through a choke and the upstream static head, thereby allowing for the design of self-regulating chokes, potentially eliminating the need for letdown valves in some low to moderate pressure applications.

This model can accommodate slurry that is near saturation pressure upstream of the valve, as well as that with significant overpressure.

This model can predict pressure and velocity changes through chokes, so that the choke can be contoured to reduce explosive flashing at the outlet and control slurry velocity entering the flash vessel.

This model can predict the expansion ratio required to reduce the flow pressure sufficiently to form a shock, thereby dissipating significant energy. A choke that achieves sufficient expansion to form such a shock is referred to as a flashtube.

This model can be continually updated and compared with measured operational data.

The following is a summary of the assumptions of the model used in this invention: The sizing of chokes for pressure letdown is based upon a one-dimensional, homogeneous equilibrium model for the slurry. The slurry is modeled as having three (3) components (phases)—solid, liquid and gas—homogeneously mixed and in equilibrium at all times, with constant properties across any cross section of the flow stream. The solid phase is used to model the part of the slurry that does not change phase during the flow and includes the dissolved solids. The liquid and vapor phases are modeled as pure water liquid and vapor phases, and the standard ASME steam tables are used to represent the state equations to model the phase changes. Inputs for the model include; the mass flow rates of the solids, dissolved solids (including acid, etc.), and water; the effective density of the solids and dissolved solids; and the effective specific heats for the solids and dissolved solids. Additional required inputs include the stagnation pressure, temperature, and quality (mass fraction of steam, if any) upstream of the valve (choke).

The basic equations used to model the slurry include: conservation of energy (with negligible heat loss and elevation change) shown as Eq. A.1, in FIG. 11; conservation of mass (mass flow is the same at all cross sections) shown as Eq. A.2 in FIG. 11; and entropy must always increase (the second law of thermodynamics) shown in Eq. A.3, in FIG. 11. If the slurry state is known reasonably close to the inlet and the outlet of the choke, it is reasonable as a first approximation to take the right side equality in Eq. A.3, in FIG. 11, which neglects friction and losses associated with heat transfer and discontinuities in the flow. A discontinuity in the form of shock can then be used to model the dissipation that must occur to allow the slurry flow to match the exit conditions in the receiving vessel. Also, in sections where the density of the slurry is reasonably constant, it is useful to model the effects of elevation changes by modifying the pressure used to determine the enthalpy in Eq. A.1 by adding an additional static pressure term, $p_s=(gH)/v$, to the pressure at the fluid/vapor interface, where H is the height of the slurry (of constant specific volume, v) between the cross section of interest and a fluid/vapor interface at the stagnation state.

For a detailed model that includes the energy dissipation associated with friction, etc., the equations Eq. A.1 through A.3 must be written in differential form and integrated from a known state at the inlet to the outlet or from a known state at the outlet to the inlet. Since, the limiting condition, which defines the mass flow rate through the choke occurs at the throat (minimum area) of the choke, this will typically require an iterative (shooting method) approach to finding the conditions at the throat before the mass flow through the choke is known. Using the isentropic assumption, the determination of the state at the throat becomes much easier. An approach which accounts for dissipation without detailed modeling of the friction has also been found to be useful, wherein the total entropy which is ultimately created between the inlet and the outlet states (stagnation states in the upstream and downstream vessels) is apportioned to the section upstream of the throat of the choke, the section between the throat and shock formation, the shock itself, and the section downstream of the shock.

The properties, h, v and s for the slurry are calculated from the constituent properties using the relations shown in FIG. 11 as A.4, A.5 and A.6. If the water in the slurry is a mixture of liquid and vapor (saturated temperature and pressure), the properties of the water include the quality (mass fraction of the water that is vapor), x, and the properties $h_w$, $v_w$, and $s_w$ are found from the relations shown in FIG. 11 as A.7, A.8 and A.9. To begin the process, the properties $h_o$, $v_o$ and $s_o$ are determined for the upstream stagnation state, defined by $T_o$ and $p_o$. Typically, at the upstream stagnation state, the water in the slurry is in a compressed liquid state, with a pressure above the saturation pressure for the given temperature, and the quality, $x_o=0$, but the method can be used if the stagnation state is saturated and has non-zero quality. Eq. A.3, of FIG. 11, is then used to determine the state at the throat of the choke (where choking occurs). If the stagnation state is compressed liquid, the pressure at which the water is saturated, having the same entropy (or slightly higher if dissipation is accounted for as entropy production) as the stagnation state, is first determined. Pressures below this pressure would only be achieved by the production (flashing) of some steam. At this pressure, the properties of the slurry are found, from which the velocity of the slurry is found from Eq. A.1 of FIG. 11 and the mass flux is determined from Eq. A.11 of FIG. 11. Thus, under the assumption that the entropy is known at each state, the mass flux, G, becomes an explicit function of pressure. It is noted that as long as the water in the slurry is in a compressed liquid state, the mass flux will increase with decreasing pressure. When the pressure decreases below the stagnation pressure, the fraction of the water converted to steam is determined under the assumption that the entropy is known, and the enthalpy and specific volume of the slurry is then determined for lower pressure, and the mass flux, G, remains an explicit function of pressure as the pressure drops and steam is formed. Choked flow occurs at the pressure (or state) where the mass flux, G, is maximized. This defines the area that is optimal for passing a given mass flow rate of the slurry, and is the basis for sizing the throat of the choke. The velocity of the slurry at the maximum mass flux is the velocity of the slurry at the throat or minimum area of the choke. If this maximum mass flux occurs after some steam is formed, the velocity at the throat where this maximum mass flux occurs is known as the "speed of sound" in the slurry, or sonic velocity. There is a discontinuity in the speed of sound in the slurry when the water reaches the saturated state and begins to form steam. The velocity of sound in compressed liquid is very high, whereas it is relatively low in a steam/liquid mixture at low quality.

Beyond the throat, when the area of the choke increases, the pressure will continue to drop and the velocity will increase, since the flow is supersonic. Continuing to determine the value of the velocity, u, and the mass flux, G, for pressures lower than the pressure at which the mass flux is maximized, results in a relationship between the pressure (and velocity or other properties) and the area of the choke. Expanding the choke beyond the throat will decrease the pressure and increase the velocity until a shock forms. The location of the formation of this shock depends upon the downstream pressure at the outlet. The pressure in the flow must be significantly below the downstream pressure before the shock will form. If the choke ends before it has expanded enough for the shock to form, oblique shocks will form as the flow exits the choke, which brings the flow near the choke outlet into equilibrium with the pressure in the flash vessel. The choke can thus be designed to control the pressure and velocity at the outlet to minimize the wear and tear created by the slurry as it enters the flash vessel.

To determine where the shock will form in an expanding choke (flashtube) requires matching the flow with the output state in the flash vessel. Knowing the pressure and temperature in the flash vessel will be at a saturated state, and that the specific enthalpy of the slurry will be the same as the upstream stagnation enthalpy, the specific entropy of the slurry when it stagnates at the flash vessel pressure is determined. If it is assumed that friction is negligible downstream of the shock (as well as upstream), then the entropy increase between the inlet and the outlet all occurs at the shock. If the friction downstream of the shock is not negligible, but the entropy increase is specified (apportioned as described above), the mass flux, G, is also an explicit function of pressure downstream of the shock.

Although the pressure, velocity and entropy change from one side of the shock to the other, continuity of matter requires that the mass flux, G, be the same on both sides of the shock. Additionally, the pressure momentum, defined as $\lceil = p + u^2/v$ must be the same on both sides of the shock to satisfy the momentum equations. These two conditions form the basis for determining the ratio of the area at which the shock forms to the area at the throat of the choke. See Eq. A.12 and Eq. A.13 of FIG. 9. These two equations can be solved for the pressure upstream, $p_u$, and the pressure downstream, $P_d$, of the shock, given the stagnation enthalpy, $h_o$, and the entropies upstream, $s_u$, and downstream, $S_d$, of the shock. The ratio of the area at the shock to the area at the throat is then determined as the ratio of the mass flux at the throat (determined previously) to the mass flux at the shock.

Figure 9:
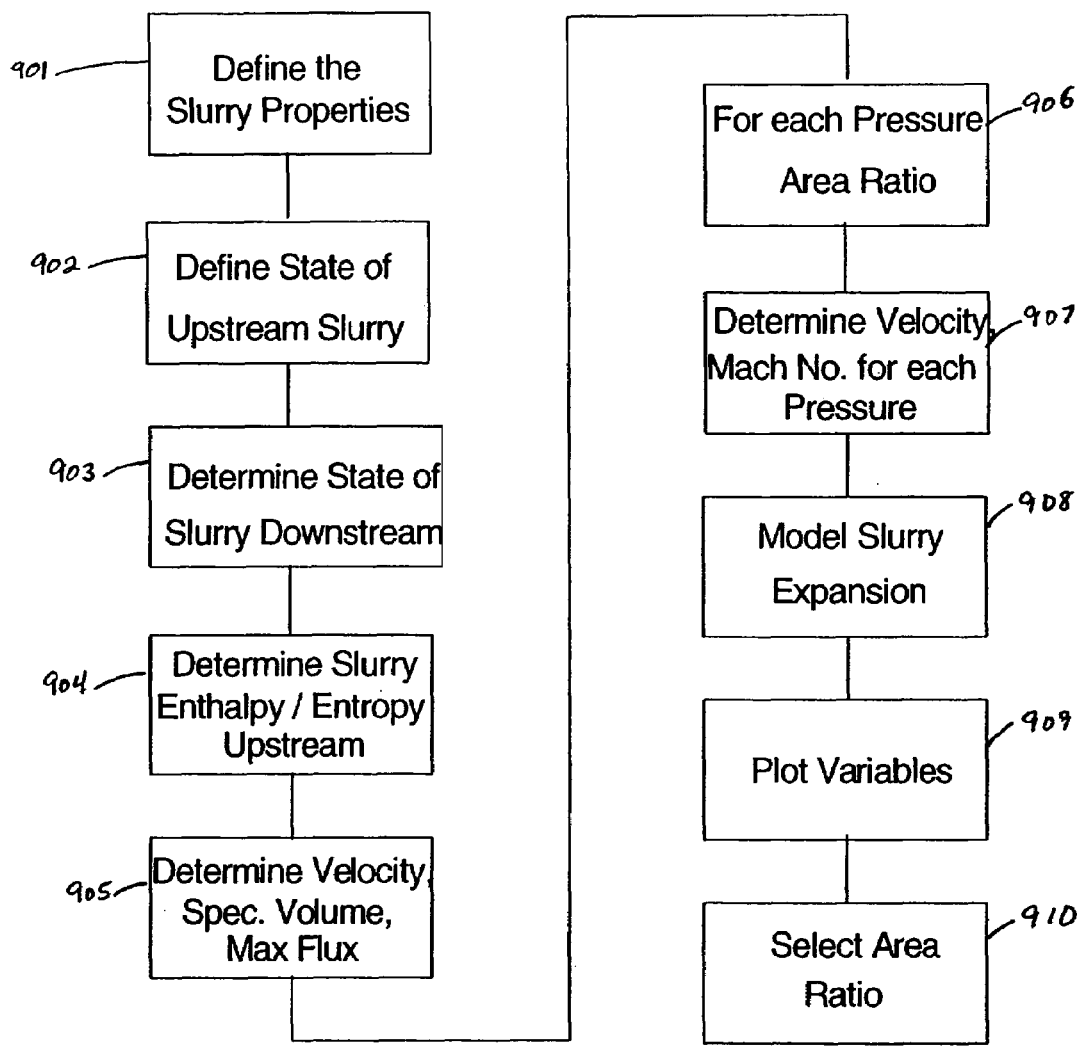
FIG. 9 is a flow chart of the present steps of manufacturing the nozzle having a desired dispersion angle.

The use of the above described model has led to the development of the method or process for making the nozzles having the desired dispersion angle as shown in FIG. 9. The properties of the slurry required to model the slurry as a homogeneous equilibrium three phase (solid, liquid and steam) fluid are defined 901. The state of the slurry upstream of the choke is defined 902. Typically, the state of the slurry is defined by the pressure, temperature and steam fraction or quality. The state of the slurry downstream of the choke is determined 903. The state of the slurry downstream is typically defined by the pressure and/or temperature since the slurry will generally be saturated. The steam fraction downstream of the choke is generally indirectly defined by the conservation laws. The slurry enthalpy and entropy upstream of the choke is determined 904. Typically, this determination is made using the techniques previously described. Using the conservation of energy and the second law of thermodynamics, slurry characteristics, including: the velocity (kinetic energy) and the specific volume (or density) of the slurry for various pressures, as well as the mass flux (G=u/v), are determined 905 for each pressure (state) of interest. Generally, at some point the mass flux will reach a maximum value as the pressure drops. This maximum value of mass flux defines the mass flux at the throat (minimum area) of the choke and is used to size the choke throat for a given slurry mass flow. This mass flux maximum value is also used to define the state of the slurry at the throat of the choke. For each pressure point of interest (defining a state of the laws of conservation) determined, the ratio between the area corresponding to a given pressure (state) and the area at the throat are determined 906, typically by taking the inverse ratio of the corresponding mass fluxes. Corresponding to each pressure (state), the velocity and Mach number of the slurry is determined 907. The slurry expansion is modeled 908 as a isentropic expansion (or alternatively a non isentropic expansion with an entropy increase to model dissipation) and the steam tables are used to determine the Mach number of the fluid as a function of the velocity determined in step 907. This step 908 also includes determining the total angle by which the streamlines of the fluid would turn during expansion from each pressure (state) of interest, along with the pressure in the exit area downstream of the choke. Typically, this modeling and determination would be performed as previous described above. Each of the variables of interest (typically: pressure, velocity and expansion angle) is plotted 909, for design purposes, presently using the area ratio as the independent variable. An area ration corresponding to the desired choke nozzle expansion angle is selected 910. This selection 910 also typically sets the velocity and pressure at the exit cross section of the nozzle. The total dispersion angle typically includes the natural expansion angle built into the choke (if any) as well as the angle the streamlines would turn during expansion. The states (pressure states) of interest can be a state at the exit of the nozzle, the final downstream state in the tank and in some embodiments the upstream states and a number of intermediate state values between the exit of the nozzle and the tank.

It is to be understood that the above-described embodiment of the invention is merely illustrative of numerous and varied other embodiments, which may constitute applications of the principles of the invention. Such other embodiments may be readily devised by those skilled in the art without departing from the spirit or scope of this invention and it is our intent that they are deemed as within the scope of our invention.

The invention claimed is:

1. A method of designing a flash nozzle, wherein said flash nozzle comprises a choke inlet, a throat, and an expanding choke outlet, wherein the choke inlet is upstream from the throat, which is upstream from the expanding choke outlet, wherein the flash nozzle is used to introduce slurry at supersonic flow rates into a flash vessel at a given operating pressure downstream from said nozzle, and wherein the flash vessel is configured to accumulate slurry in a slurry pool contained therein, wherein the method comprises:

specifying a choke angle, X, representing the angle from an axis of the flash nozzle at which said expanding choke outlet expands;

defining slurry flow properties at a point located before the slurry enters said flash nozzle, wherein said slurry flow properties comprise at least one of density, flow rate, pressure, temperature, solid fraction, and vapor fraction;

modeling the slurry expansion in the flash vessel starting at the point where the slurry exits the expanding choke outlet, wherein said modeling is based on said flash vessel operating pressure, said choke angle, X, and thermodynamic characteristics of said slurry, wherein said expansion of the slurry past the end of said expanding choke outlet is defined by a slurry expansion angle, Y;

repeating the above steps with a new choke angle, X, until a total dispersion angle, X plus Y, is achieved, wherein said total dispersion angle, X plus Y, is greater than said choke outlet angle, X; and producing a flash nozzle from said model having a choke outlet angle of X, wherein said total dispersion angle, X plus Y, is greater than said choke outlet angle, X, for said defined slurry flow properties and said flash vessel operating pressure.

2. The method of claim 1, further comprising calculating an expanding choke outlet area based on said specified choke outlet angle, X.

3. The method of claim 1, further comprising calculating a throat area based on said specified choke outlet angle, X, and said expanding choke outlet area, such that said total dispersion angle, X plus Y, is greater than said choke outlet angle, X.

4. The method of claim 3, further comprising setting a expanding choke outlet area to throat area ratio, such that said total dispersion angle, X plus Y, is greater than said choke outlet angle, X.

5. The method of claim 4, wherein said expanding choke outlet area to throat area ratio is greater than about 1.

6. The method of claim 4, wherein said choke outlet angle, X, is specified by specifying said expanding choke outlet area.

7. The method of claim 1, wherein said thermodynamic characteristics comprise at least one of enthalpy, entropy, and mach number.

8. The method of claim 1, wherein said total dispersion angle, X plus Y, meets the objective of spreading the expanding slurry over a significant area of the slurry pool, thereby minimizing the wear and tear to said flash vessel.

9. A method of designing a flash nozzle, wherein said flash nozzle comprises a choke inlet, a throat, and an expanding choke outlet, wherein the choke inlet is upstream from the throat, which is upstream from the expanding choke outlet, wherein the flash nozzle is used to introduce slurry at supersonic flow rates into a flash vessel at a given operating pressure downstream from said nozzle, and wherein the flash vessel is configured to accumulate slurry in a slurry pool contained therein, wherein the method comprises the steps of:

specifying a choke angle, X, representing the angle from an axis of the flash nozzle at which said expanding choke outlet expands;

defining slurry flow properties at a point located before the slurry enters said flash nozzle, wherein said slurry flow properties comprise at least one of density, flow rate, pressure, temperature, and steam fraction;

calculating an expanding choke outlet area, wherein said expanding choke outlet area varies based on said specified choke angle, X;

specifying a throat area, wherein said throat area is independent of said specified choke outlet angle, X; and modeling the slurry expansion in the flash vessel starting at the point where the slurry exits the expanding choke outlet, wherein said modeling is based on the pressure vessel operating pressure, the ratio between said expanding choke outlet area and said throat area, and thermodynamic characteristics, wherein said thermodynamic characteristics comprise at least one of enthalpy, entropy, and mach number, and wherein said modeling calculates an angle of slurry expansion from the expanding choke outlet slurry defined as expansion angle, Y, and wherein the sum of said choke outlet angle, X, and said slurry expansion angle, Y, creates a total dispersion angle, X plus Y, which is greater than said choke outlet angle, X;

producing a flash nozzle from said model having a choke outlet angle of X, wherein said total dispersion angle, X plus Y, is greater than said choke outlet angle, X, for said selected slurry flow properties and the pressure vessel operating pressure.

10. The method of claim 9, further comprising the step of requiring that said total dispersion angle, X plus Y, meets the objective of spreading the expanding slurry over a significant area of said slurry pool.

11. The method of claim 9, wherein said modeling step assumes that said slurry is a homogeneous equilibrium, three-phase fluid.

12. The method of claim 9, wherein said modeling step assumes an isentropic expansion.

13. The method of claim 9, wherein said flash nozzle further comprises a plug head for opening and closing said throat.

14. The method of claim 10, wherein said objective of spreading the expanding slurry over a significant area of the slurry pool requires that substantially all of the expanded slurry contacts the slurry pool in said flash vessel, thereby minimizing the slurry contacting the walls of said flash vessel and thereby reducing the velocity with which the expanded slurry contacts the bottom of the vessel.

* * * * *